United States Patent [19]

Surdi

[11] Patent Number: 5,700,133
[45] Date of Patent: Dec. 23, 1997

[54] DAMPER DISPOSITION MOUNTED BETWEEN ROTOR VANES

[75] Inventor: Jean Marc Surdi, Rubelles, France

[73] Assignee: Societe Nationale d'etude et de Construction de Moteurs d'Aviation SNECMA, Paris, France

[21] Appl. No.: 714,978

[22] Filed: Sep. 17, 1996

[30] Foreign Application Priority Data

Sep. 21, 1995 [FR] France ................... 95 11079

[51] Int. Cl.⁶ ........................................... F01D 5/10
[52] U.S. Cl. ............................... 416/248; 416/500
[58] Field of Search ........................... 416/248, 500

[56] References Cited

U.S. PATENT DOCUMENTS

| | | | |
|---|---|---|---|
| 4,111,603 | 9/1978 | Stahl | 416/248 |
| 5,143,517 | 9/1992 | Vermont | 416/500 |
| 5,156,528 | 10/1992 | Bobo | 416/248 |
| 5,161,949 | 11/1992 | Brioude et al. | 416/500 |
| 5,205,713 | 4/1993 | Szpunar et al. | 416/500 |
| 5,226,784 | 7/1993 | Mueller et al. | 416/248 |
| 5,520,514 | 5/1996 | Mareix et al. | 416/248 |
| 5,599,170 | 2/1997 | Marchi et al. | 416/500 |

FOREIGN PATENT DOCUMENTS 0 089 272  9/1983  European Pat. Off. .
2 138 078  10/1984  United Kingdom .

*Primary Examiner*—John T. Kwon
*Attorney, Agent, or Firm*—Oblon, Spivak, McClelland, Maier & Neustadt, P.C.

[57] ABSTRACT

Damper disposition (8) mounted between two neighboring vanes (5) and which includes free inners (22) in housings (21) delimited by a radially external wall (16) slanted outwardly in the direction of the respective vane (5). The centrifugal forces produced by rotation of the disk of the rotor (4) move the inners (22) outside the housings (21) and forcibly apply them to the vanes (5) so as to dampen the vibrations, especially when considerable friction is produced against the outer wall (16).

Application for turbo-engines and especially for the large vanes of input blowers.

3 Claims, 2 Drawing Sheets

5,700,133

DAMPER DISPOSITION MOUNTED BETWEEN ROTOR VANES

FIELD OF THE INVENTION

The invention concerns a damper disposition mounted between the vanes of a rotor.

BACKGROUND OF THE INVENTION

The object of the invention is to dampen the beating vibrations of the vanes in a tangential direction, that is the direction of rotation of the disk on which the vanes are mounted. As shall be seen subsequently, elements are used able to move between the vanes and pushed back by the centrifugal forces, as in a large number of previous conceptions, such as those illustrated in the French patent 2 352 159, or for a more complicated embodiment in the U.S. Pat. No. 4,182,590. In these conceptions, a mobile element presses simultaneously on the platforms of two neighbouring vanes used to channel the gases, thus forming an outer smooth continuous surface at the foot of the vanes, these platforms being slanted radially outwardly from the blade of the vane, that is when the two platforms on meeting draw a sort of arch above the mobile element. This element is thus pushed back by centrifugal forces to the middle of the arch at the joining point of the two platforms. The beatings of the vanes in a tangential direction make the platforms slide onto the surfaces of the element which produces frictions damping the vibrations.

This particular conception is widely used for small mobile vanes, such as those of a compressor or aircraft engine turbine, but is less effective for larger vanes encountered on the blower when it is desired to lighten said vanes as much as possible so as to reduce their inertia. An extremely frequent measurement then consists of suppressing the platforms. The free damping elements then lose the surfaces retaining them.

Another conception appears in the French patent 2 669 686. The gas flow vein here is not delimited by vane platforms meeting together at the arch, but by shoe-shaped elements mounted on the rotor disk and externally including a platform which fills up the gap between two neighbouring vanes. Damping elements are found under these platforms and are composed of a pair of inners situated against the lateral face of a respective vane stilt and an arch brace constituting a spring connecting the inners. As the arch touches the platform at its top, centrifugal forces cause it to open by radially moving the inners and this opening contributes in moving the inners tangentially and presses them onto the stilts of the vanes. However, this tangential force of the movements is slight which means that the pressure force between the inners and the vanes is less significant and the beating vibrations of the vanes are not properly contained.

SUMMARY OF THE INVENTION

The design of the invention is more effective for damping the beating vibrations of the vanes by means of inners pressed against their stilts by means of centrifugal force, the inners being retained more effectively than by a spring which brings them together by pairs.

Each of them is disposed in a housing of a receptacle integral with the rotor disk. The housings open towards the lateral faces of the vanes and are radially delimited outwardly by receptacle portions having a radial inclination outwardly in the direction of opening of the housings.

The inners thus slide against these portions under the effect of centrifugal forces and are pushed back outside the housings until they touch the vanes. They are applied with a certain amount of force which depends on the centrifugal force, but also the inclination of the receptacle portions and which may be relatively high. The vibrations of the vanes, which need to overcome this pressure force and also a significant friction force between the outer surface of the inners and the outer portions of the receptacles, are thus considerably dampened.

BRIEF DESCRIPTION OF THE DRAWINGS

These details and characteristics of the invention and other factors shall appear more clearly from reading the description of the following drawings illustrating a non-restrictive embodiment of the invention.

DETAILED DESCRIPTION OF THE PREFERRED EMBODIMENTS

Figure 1:
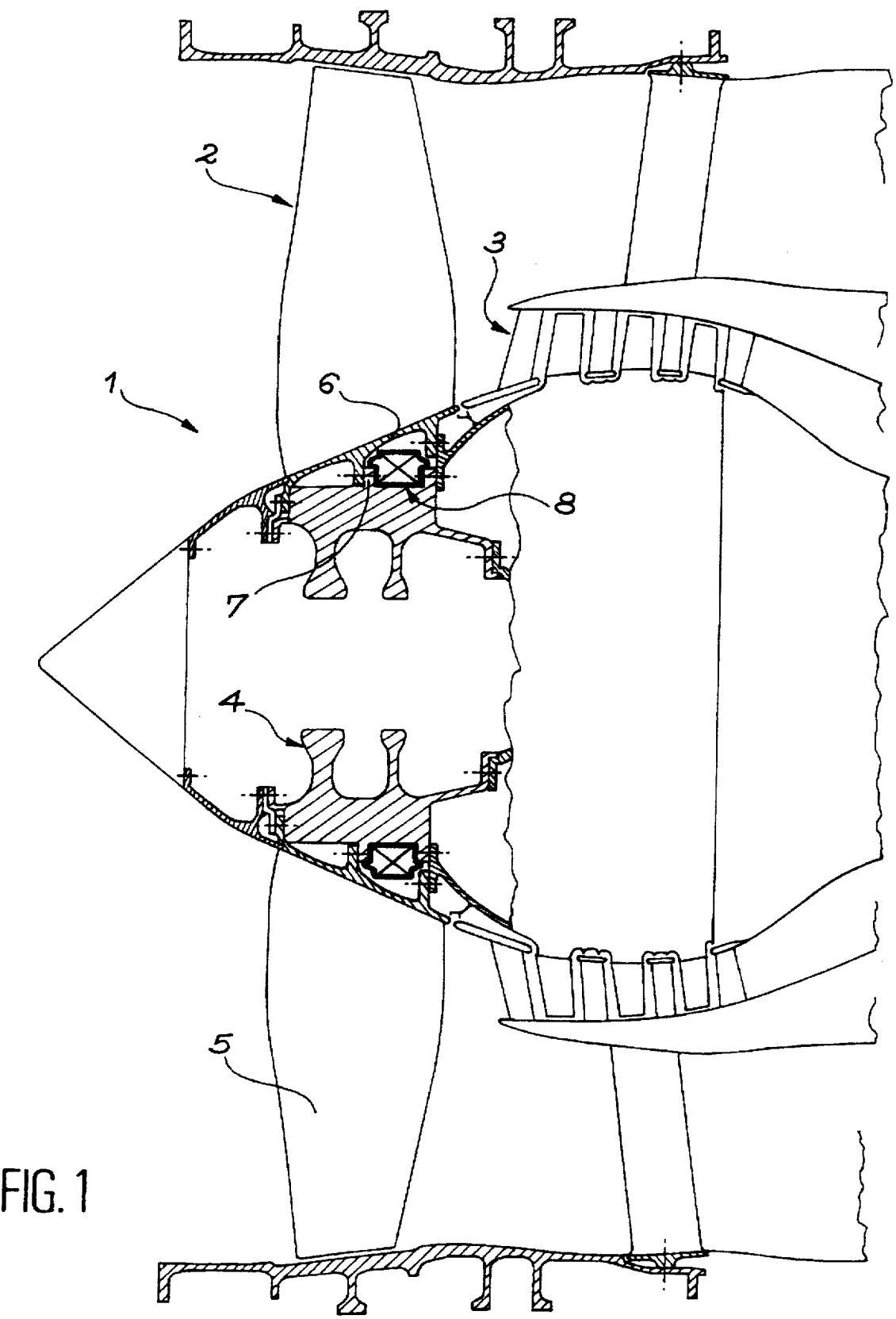
FIG. 1 represents a situation using the damper disposition of the invention.

FIG. 1 shows the front portion of a turbo-engine and the blower 1 at the entrance of the gas flow vein 2 in front of the low pressure compressor 3. The blower 1 is mainly composed of a rotor disk 4, blower vanes 5 whose feet are inserted in the broachings of the disk 4, and intermediate platforms 6 bolted to flanges 7 of the disk 4 and which keep the vanes 5 in their angular position. The intermediate platforms 6, like the shoes of the latter mentioned patent, form a crown delimiting the gas flow vein 2.

Added to these elements are the damper dispositions 8 of the invention. These dispositions extend radially between the platforms 6 and the rotor disk 4 and tangentially between the neighbouring vanes 5. A damper disposition 8 is located between each pair of vanes 5.

Figure 2:
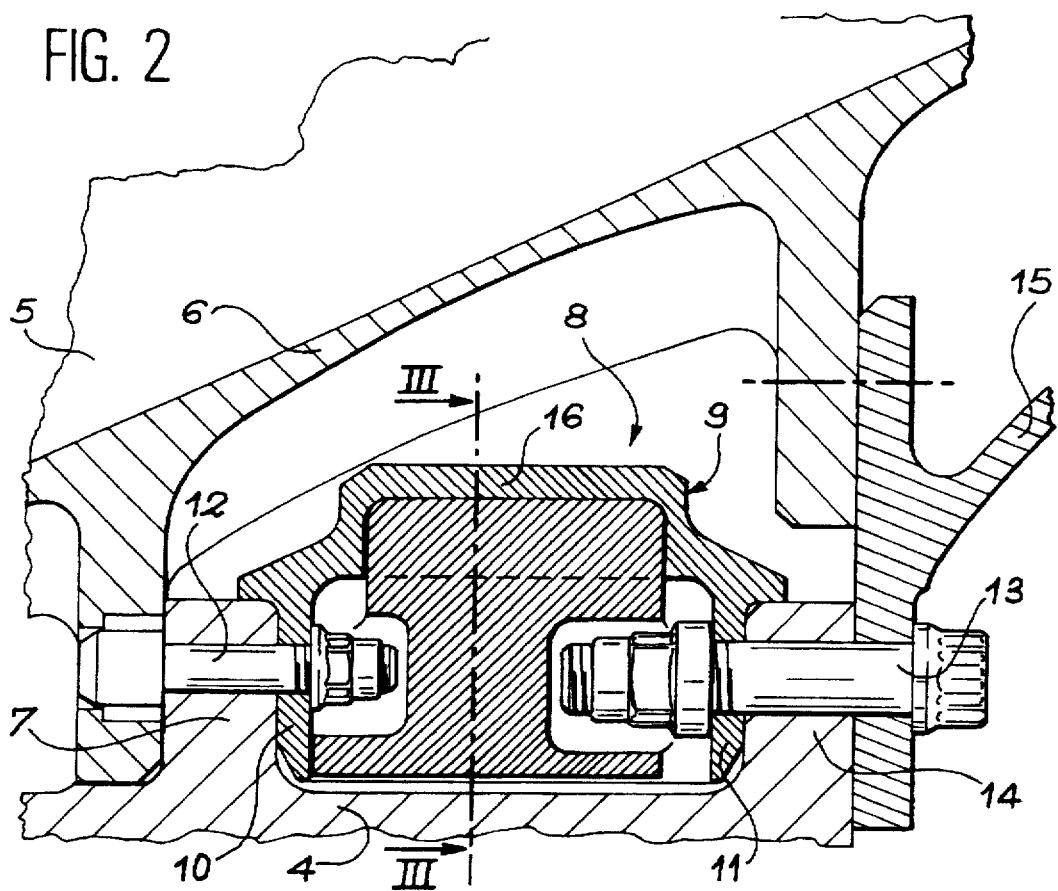
FIGS. 2 and 3 represent sections of this disposition respectively along the line II—II of FIG. 3 and line III—III of FIG. 2.
Figure 3:
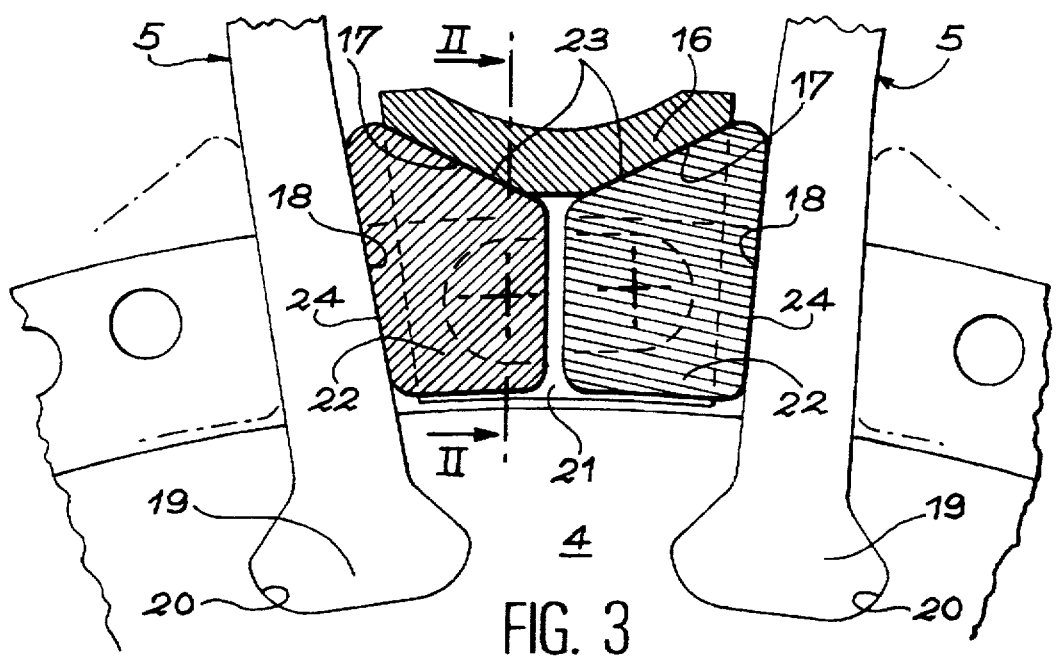

Reference is now made to FIGS. 2 and 3. A damper disposition 8 includes a receptacle 9 fitted with two extreme flanks 10 and 11 connected by sets of bolts 12 and 13 respectively to fixing flanges 7 of the platforms 6 and to a joining flange 14 of the disk 4 and a casing 15 of the low pressure compressor rotor 3. The flanks 11 and 12 are connected together by an outer wall 16 which, as can be seen on FIG. 3, is bent back and externally concave so that its inner face 17 (orientated towards the disk 4) is slanted radially towards the outside of the two sides in the direction of the lateral faces 18 of the vanes 5 or more specifically the lateral faces of their stilt immediately adjacent to the vane foot 19 engaged in a broaching 20 of the disk 4.

Housings 21 extend under the inner face 17 and between the flanks 10 and 11. They are each occupied by a inner 22 having one outer radially face 23 rubbing against the face 17 and one tangentially outer face 24 touching against the lateral face 18 of the stilts of the vanes 5, at least during operation, when sufficient centrifugal forces are exerted so as to make the inners 22 project outside the housings 21 by sliding obliquely along one side of the inner face 17. For the rest of the time, the inners are surrounded by the receptacle 9, the vanes 5 and the disk 4 and thus remain kept inside their housing 21. By using a single receptacle 9 with two housings 21 and two inners 22 for two neighbouring vanes 5 and housings 21 communicating via the bottom, a simpler lighter disposition is obtained.

The damper disposition 8 lends itself to a large number of modifications, such as changing the weight or shape of the inners 22 or the inclination of the inner face 17. The picking up of the centrifugal forces by the bolts 12 and 13 uniting other rotating elements in addition to the receptacles 9 of the disk 4 avoids complicating the device and ought to equalise the forces of the flanges 7 and 14.

What is claimed is:

1. Damper disposition mounted between two neighbouring vanes attached to a rotor disk and including a receptacle integral with the disk and fitted with housings opening towards the lateral faces of the vanes, and inners disposed in the housings, wherein the housings are delimited radially outwardly by portions of the receptacle on which the inners slide under the effect of centrifugal forces and which are slanted radially outwardly in the direction of the vanes where the housings open.

2. Damper disposition according to claim 1, wherein the receptacle is bolted to at least one flange of the disk, a crown delimiting a gas flow vein being also bolted to said flange.

3. Damper disposition according to claim 1 or 2, wherein the housings are distributed by pairs in the receptacle, the housings of the pairs respectively opening towards the two vanes and communicating together.

* * * * *